United States Patent
Granshaw et al.

(10) Patent No.: US 9,524,747 B2
(45) Date of Patent: Dec. 20, 2016

(54) CONTROLLING PERSISTING OF DATA TO DISK

(71) Applicant: International Business Machines Corporation, Armonk, NY (US)

(72) Inventors: David Granshaw, Eastleigh (GB); Samuel T. Massey, Southhampton (GB); Daniel J. McGinnes, Southhampton (GB); Martin A. Ross, Gosport (GB); Richard G. Schofield, Eastleigh (GB); Craig H. Stirling, Hedge End (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 13/938,327

(22) Filed: Jul. 10, 2013

(65) Prior Publication Data

US 2014/0078876 A1 Mar. 20, 2014

(51) Int. Cl.
*G11B 20/10* (2006.01)
*G06F 9/54* (2006.01)

(52) U.S. Cl.
CPC ........... *G11B 20/10* (2013.01); *G06F 9/546* (2013.01); *G06F 2209/547* (2013.01)

(58) Field of Classification Search
None
See application file for complete search history.

(56) References Cited

U.S. PATENT DOCUMENTS

| 6,934,757 | B1* | 8/2005 | Kalantar et al. ............. 709/229 |
| 7,093,261 | B1 | 8/2006 | Harper et al. |
| 7,949,720 | B2 | 5/2011 | Vernal et al. |
| 2002/0078132 | A1 | 6/2002 | Cullen et al. |
| 2006/0256786 | A1 | 11/2006 | Bibr et al. |

(Continued)

OTHER PUBLICATIONS

Athicha Muthitacharoen et al. "A Low-bandwidth Network File System," SOSP '01 Proceedings of the eighteenth ACM symposium on Operating systems principles pp. 174-187.*

(Continued)

*Primary Examiner* — Brian Peugh
*Assistant Examiner* — Dustin Bone
(74) *Attorney, Agent, or Firm* — Cantor Colburn LLP; David Woycechowsky (57) ABSTRACT

Embodiments relate to controlling persisting of data to disk for use with a messaging system including an application operable for generating and sending a message to a destination. An aspect is an apparatus, which includes a comparator operable to determine whether the message includes common data, and an extractor, responsive to a determination that the message includes common data, configured to extract the common data and non-common data from the message. The apparatus also includes a persistor operable to determine whether the common data have already been persisted to disk. The persistor is operable, in response to a determination that the common data have not already been persisted to disk, to separately persist the common data and the non-common data to disk. The persistor is operable, in response to a determination that the common data have already been persisted to disk, to persist the non-common data to disk.

20 Claims, 7 Drawing Sheets (56) References Cited

U.S. PATENT DOCUMENTS

| | | | |
|---|---|---|---|
| 2008/0127208 A1 | 5/2008 | Bedi et al. | |
| 2010/0017441 A1 | 1/2010 | Todd | |
| 2010/0082672 A1* | 4/2010 | Kottomtharayil ... | G06F 11/1451 707/770 |
| 2010/0274846 A1 | 10/2010 | Bittles et al. | |
| 2011/0289281 A1* | 11/2011 | Spackman .................... | 711/154 |
| 2012/0173656 A1* | 7/2012 | Sorenson, III ................ | 709/217 |
| 2013/0198459 A1* | 8/2013 | Joshi et al. ................... | 711/130 |

OTHER PUBLICATIONS

ACM Digital Library, A novel disk queue to reduce disk I/O of messaging system, retrieved from the internet: http://dl.acm.org/citation.cfm?id=881790&dl=ACM&coll=DL on Jan. 13, 2012, 2 pages.

Oracle, High Performance Message Processing with BMT Message-Driven Beans and Spring, retrieved from the internet: http://www.oracle.com/technetwork/articles/entarch/custom-mdb-process on Jan. 13, 2012, 4 pages.

GB Application No. GB1316057.7 Combined Search and Examination Report dated Jan. 31, 2014, 5 pages.

Y. Morais, et al., Customizing Message-oriented Mobile Middleware, IEEE 2010 6th International Conference on Wireless and Mobile Communications, Sep. 2010, pp. 356-361.

* cited by examiner

CONTROLLING PERSISTING OF DATA TO DISK

PRIORITY

The present application claims priority to Great Britain Patent Application No. 1216436.4, filed on 14 Sep. 2012, and all the benefits accruing therefrom under 35 U.S.C. §119, the contents of which in its entirety are herein incorporated by reference.

BACKGROUND

The present disclosure relates to an apparatus for controlling persisting of data to disk.

In recent years, the ability of application programs to communicate with each other or with system provided services in a computer system or network without having to become involved in the complexities of particular operating systems or communication protocols has been much enhanced by the development of Message Oriented Middleware (MOM) systems. MOM comprises software executable on a computer operating system which provides a common programming interface by means of which applications can communicate with other applications without specific knowledge of the different operating systems and/or protocols which may be used by those applications.

Some MOM products employ message queuing which allows programs to send and receive application specific data to each other without having a private, dedicated logical connection established between them. Instead, the applications communicate using messages containing a message descriptor and the application specific data. The messages are held on queues by a queue manager. The queue manager is effectively the runtime component of the MOM product and may also be referred to as a messaging server.

With the increasing demand for high performance messaging, there is a current focus on identifying mechanisms for more efficient processing within messaging systems.

Current messaging systems typically enable a delivery model to be specified such that, for example, messages that contain business critical data are persisted to disk (or other forms of reliable storage device), such that a message can still be recovered and processed following e.g., machine reboots and application failures/shutdown. In more detail, a queue can be configured with a defined quality of service such that messages stored using the queue are not lost under any circumstance (e.g., network power outage)—messages containing business critical data are sent to such a queue and subsequently persisted to disk. Note that a queue is an artifact that provides a layer of abstraction and administration from the disk itself.

Some messaging systems extend this concept further and provide a message reliability level for finer grained control associated with the quality of service provided with regards to the conditions under which messages can be discarded. In some scenarios, it is acceptable for messages to be discarded, e.g., if a server computer system becomes resource constrained, while in others, it may be preferable to retain messages even at the risk of overloading the server computer system.

Figure 1:
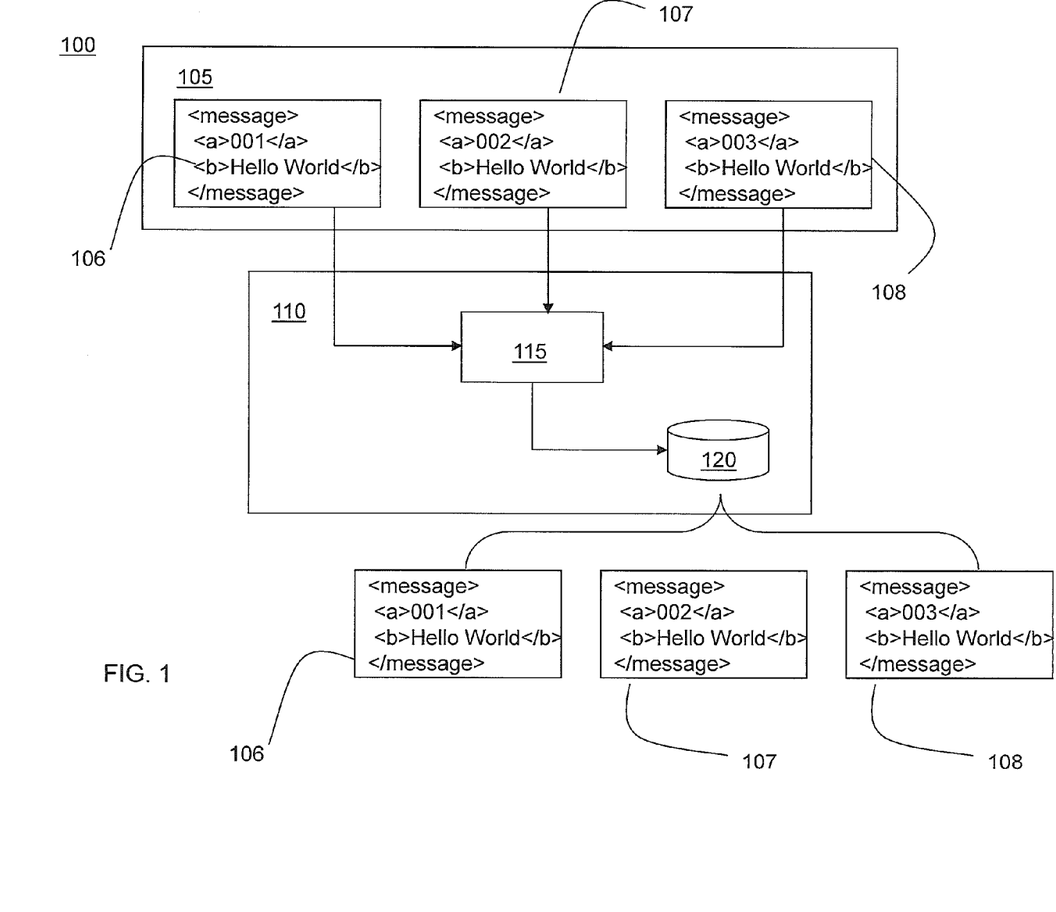
FIG. 1 is a block diagram of a prior art messaging system.

For example, in a system 100 shown in FIG. 1, a client application 105 generates one or more messages 106, 107 and 108 and sends each of the messages to a message queue 120 of a messaging system 115 residing on a server computer system 110. Message reliability levels having a plurality of values can be associated with the message queue 120 such that e.g., the messages 106, 107 and 108 can be persisted to disk.

If the reliability level is fairly low, causing at least some messages to be discarded, there is a risk that messages are lost e.g., at restart of the server computer system or when the server computer system has a heavy workload. However, as the reliability level is increased, causing at least some messages to be written to disk, this causes an overhead on the messaging system and associated system performance decreases. Further, read/write operations to disk can be slow.

Although clustering of physical disks can be used to aid the situation, the associated costs of e.g., extra hardware and power consumption does not make it an attractive solution for messaging systems—a more efficient approach is required to ensure that the physical disk does not become the system bottleneck while still providing for reliability.

There are a number of current solutions which address the above constraints and bottlenecks In one solution, message data are persisted to disk and a copy of the data are also cached to enable data to be accessed without e.g., accessing the disk for read operations—although this solution offers improved read access to the data, the same volume of data still has to be written to disk.

In another solution, asynchronous I/O is used to write message data to disk—although this solution improves the performance when writing to disk, the same volume of data still has to be written to disk. Also, there is a risk that messages are lost e.g., if a messaging system fails before the asynchronous write is completed.

In yet another solution, message compression can be used to optimize the size of message data being written to disk—however, this solution can be a CPU intensive operation and further, if a message is small (e.g., less than a few KB in size) compression can actually cause an increase in a message's size.

SUMMARY

Embodiments include an apparatus, method, and computer program product for controlling persisting of data to disk for use with a messaging system including an application operable for generating and sending a message to a destination. The apparatus includes a comparator operable to determine whether the message includes common data, and an extractor, responsive to a determination that the message includes common data, configured to extract the common data and non-common data from the message. The apparatus also includes a persistor operable to determine whether the common data have already been persisted to disk. The persistor is operable, in response to a determination that the common data have not already been persisted to disk, to separately persist the common data and the non-common data to disk. The persistor is operable, in response to a determination that the common data have already been persisted to disk, to persist the non-common data to disk.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The present invention will now be described, by way of example only, with reference to exemplary embodiments thereof, as illustrated in the following drawings.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In a modern messaging environment, a higher level of message reliability is typically required to ensure that message data are not lost.

Typically, messages being processed have significant commonalities e.g., messages generated by a particular client application may each contain identical information such as particular protocol headers, schemas and/or structures.

With this in mind, there is provided a method by which the performance of messaging persistence in messaging systems is improved due to a reduced quantity of data being written to disk while still maintaining an assured persistent quality of service.

An exemplary embodiment allows a subset of data to be persisted for messages with a degree of commonality.

An exemplary embodiment determines which messages associated with a particular scope share common data such that only non-common data need be persisted. Examples of a scope comprise a particular queue (wherein messages can arrive to the particular queue from a number of client applications); a particular client application; a particular socket and a particular operation. Defining a scope aids in grouping messages with common data (e.g., as messages from the same queue or from the same client application are more likely to have common data) but the embodiment can be implemented to function without a scope e.g., the embodiment can monitor messages from a number of client applications in order to find messages having common data.

Persisting only a subset of data can significantly reduce disk activity and improves achievable run-time performance.

Exemplary embodiments will now be described with reference to the figures.

Figure 2A:
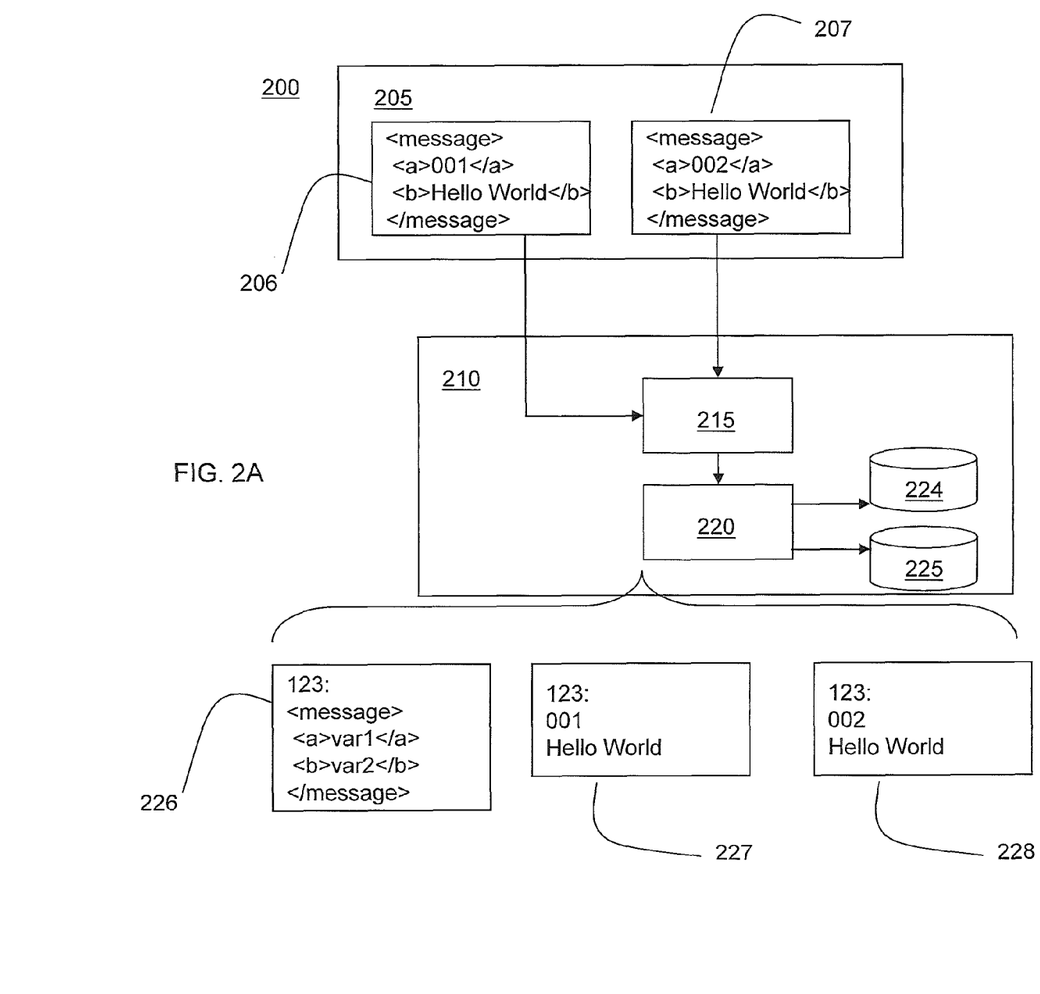
FIG. 2A is a block diagram of a messaging system according to an embodiment.

A system 200 of an embodiment is shown in FIG. 2A and comprises a client application 205 operable to generate one or more messages 206 and 207; a server computer system 210 comprising a messaging system 215, an evaluator component 220; a disk 224; a message queue 225; and sub-portions 226, 227 and 228 of the messages.

Figure 2B:
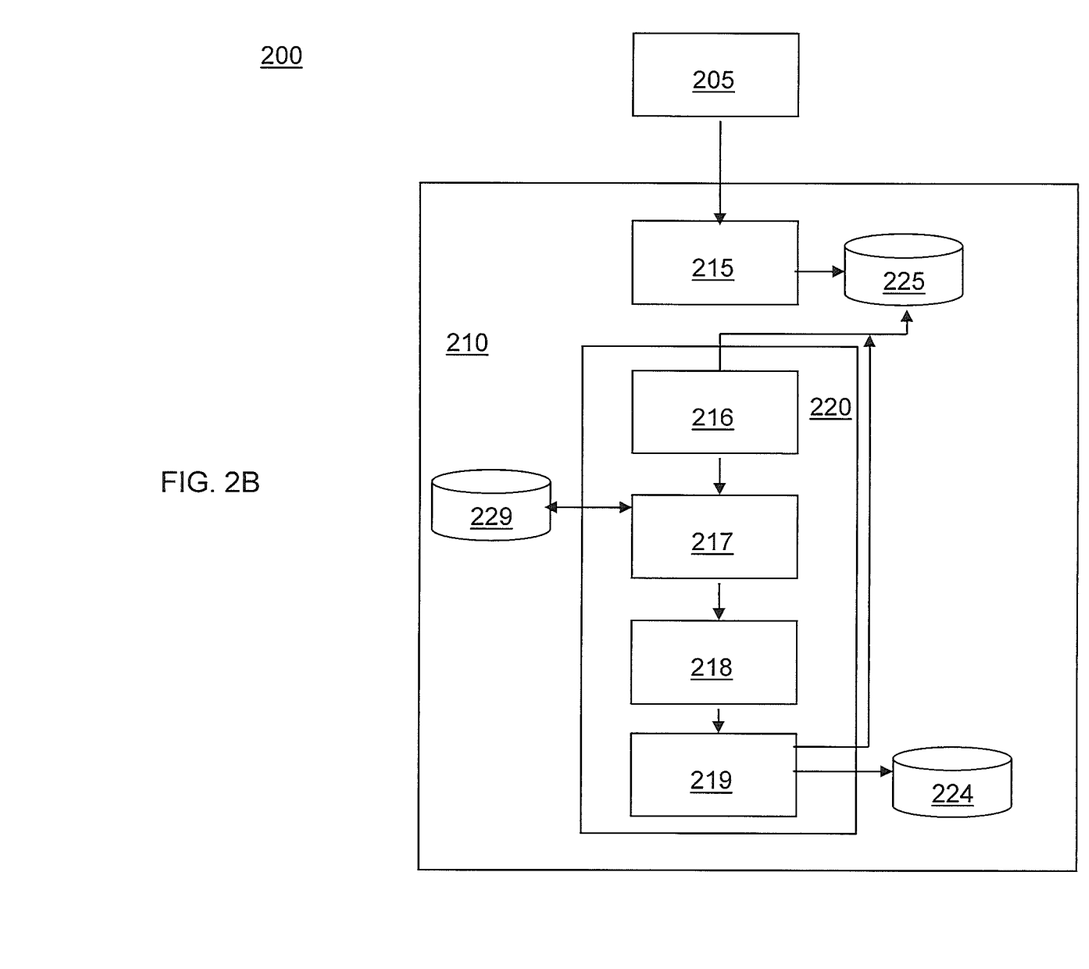
FIG. 2B is a block diagram of an evaluator component according to an embodiment.

The evaluator component 220 is shown in more detail in FIG. 2B and comprises a storer 216 operable to access the message queue 225; a comparator 217 operable to access one or more rules 229; an extractor 218 and a persistor 219 operable to access the disk 224 (e.g., a file based data store or a database).

A flow chart showing the operational steps involved in a process of an embodiment will now be described with reference to FIG. 3.

In a pre-processing block, the message queue 225 is configured with a relatively high message reliability level such that each message received on the message queue 225 is persisted. Examples of message reliability levels can be found at the IBM (IBM is a registered trademark of International Business Machines Corporation) Information Center for Express (i5/OS), Version 6.1>Administering applications and their environment>Administering Web Sphere applications>Service integration>Service integration buses>Learning about service integration buses>Message reliability levels. Examples of message reliability levels used in WebSphere (WebSphere is a registered trademark of International Business Machines Corporation) Application Server are: Best effort nonpersistent; Express nonpersistent; Reliable nonpersistent; Reliable persistent and Assured persistent. Such a message reliability level can be assigned to a queue when it is created.

Further, in another embodiment, a scope is defined—in the example herein, the scope is associated with a particular client application 205.

At block 300, the client application 205 generates a first message 206 depicted in FIG. 2A.

At block 305, the client application 205 sends the generated first message 206 to the messaging system 215 which stores the first message 206 using the message queue 225.

Example psuedocode (using Java Message Service (JMS) (Java and all Java-based trademarks and logos are trademarks or registered trademarks of Oracle and/or its affiliates) messaging) that represents the generation and sending of messages is shown below:

1 ConnectionFactory connectionFactory=(ConnectionFactory)jndiContext.lookup("jms/cf");
2 Destination destination=(Destination) jndiContext.lookup("jms/dest");
3 Connection connection=connectionFactory.createConnection( );
4 Session session=connection.createSession(true, Session.AUTO_ACKNOWLEDGE);
5 MessageProducer producer=session.createProducer(destination);
6 TextMessage message=session.createTextMessage( );
7 producer.send(message);

In the above pseudocode, "1" represents retrieval of a ConnectionFactory object defined on a messaging server; "2" represents retrieval of a JMS provider; "3" represents creating a connection from the ConnectionFactory object to the JMS provider; "4" represents creating a Session object for producing and consuming messages; "5" represents creating a Producer object which has the ability to send a generated message to a queue; "6" represents generating a message and "7" represents the Producer object sending the generated message.

The first message 206 is intercepted by the storer 216 of the evaluator component 220 and at block 310, the storer 216 stores information associated with the first message 206. The message information may be held in memory. The message information may be associated with the scope, for example:

"Message 001 originates from client application 205".

The storer 216 passes the first message 206 and associated message information to the comparator 217.

At block 315, the comparator 217 analyzes the first message 206 and the associated message information to determine whether the first message 206 contains common data.

The comparator 217 can analyze any subset of a message. For example, the comparator 217 can analyze a header or a schema of the message. A user can identify the subsets of a message to be analyzed by the comparator 217 as a user may have knowledge of particular subsets of message that are more likely to be common and thus, the operational overhead of the comparison will be reduced by directing the comparator 217 to analyze particular subsets.

In the example herein, the comparator 217 is operable to analyze a schema of a message.

Schemas are used to provide a structure to message data.

Some MOM applications expose an interface that a deployed client application can be contacted through. For example, if a client application is required to communicate with a particular service, the service defines one or more schema that are published—an example of a schema is shown below where a first variable associated with the following tags "<a></a>" is an string and a second variable associated with the following tags "<b></b>" is a string:

```
<message>
<a>var1</a>
<b>var2</b>
</message>
```

The client application uses the schema such that a message sent by the client application conforms to the schema.

In an implementation, an assumption can be made that the client application will use the schema for subsequent messages also.

Alternatively, an assumption can be made that messages being sent to a certain queue (a particular scope) which is used by a particular service will conform to a particular schema or a defined set of schema.

In the example herein, an assumption can be made that the client application 205 is using the same schema for messages that it generates and sends, wherein with reference to the first message 206 in FIG. 2A, the schema is represented below:

```
<message>
<a>var1</a>
<b>var2</b>
</message>
```

In response to the assumption, the comparator 217 is pre-configured to make a determination at block 315 that the first message 206 sent by the client application 205 contains common data and associates the determination with the message information of the first message 206.

Alternatively, at block 315, the comparator 217 parses each of the messages sent by the client application 205 in order to determine whether the messages share common data in the form of a schema by matching data associated with each of the messages.

At block 315, the comparator 217 uses its analysis associated with the determination of whether the first message 206 contains common data and the one or more rules 229 to determine whether common data and non-common data should be separated and persisted separately or whether such optimization is unlikely to yield a performance benefit and thus, each message should be persisted to disk.

The rules may be pre-defined and associated variables can be user-modifiable. Block 315 can be executed on a continuous basis—alternatively, block 315 is operable to be controlled e.g., such that if system resources are constrained, block 315 is paused.

In a first example, in order to determine whether a performance benefit can be gained, the comparator 217 determines an amount (e.g., percentage) of messages that share common data. In the example herein, the comparator 217 counts a total number of messages; counts a total number of messages which share common data; and applies a function to convert the total number of messages which share common data into a percentage of the total messages as shown below:

total number of messages which share common data/
total number of messages*100

In the example herein, as the comparator 217 is pre-configured to make a determination that each of the messages sent by the client application 205 share common data in the form of schema, the result is shown below:

1/1*100=100%

In accordance with Rule 1 below, the comparator 217 determines whether common data and non-common data should be separated and persisted separately.

Rule 1: If data are common across <5% of messages, do not separate common data and non-common data In the example herein, given that data are common across 100% of the messages and 100% is not less than 5%, in accordance with Rule 1, the comparator 217 determines that common data and non-common data should be separated and persisted separately.

Advantageously, using Rule 1, if data are common across a relatively large percentage of messages, larger performance savings can be made by separating common data and non-common data for persisting to disk.

At block 315, if the comparator 217 determines that a performance benefit is not to be expected, the persistor 219 persists (block 325) the first message 206 to the disk 224 in its entirety.

In the example herein, at block 315, as the comparator 217 determines that a performance benefit is to be expected in accordance with Rule 1, the extractor 218 extracts (block 320) common data from the first message 206 by parsing the first message 206 in order to find schema data items which are enclosed in tags (a tag being a data item that in sequence, starts with a start tag, "<" and ends with an end tag ">"). The extractor 218 also extracts (block 320) non-common data by parsing the first message 206 in order to find data which is not enclosed in a sequence starting with a start tag, "<" and ending with an end tag ">".

The results of the parsing and extraction undertaken by the extractor 218 are shown below wherein the extractor 218 is pre-configured to represent any non-common data it finds located within the common data as variables (e.g., var1 and var2).

The common data are shown below:

```
<message>
<a>var1</a>
<b>var2</b>
</message>
```

The non-common data are shown below:
001
Hello World

Referring back to FIG. 3, at block 330, the persistor 219 determines whether common data have already been persisted to the disk 224 by querying a data store (e.g., the disk 224 or a cache) with a unique reference. For example, if the disk 224 comprises a database, the persistor 219 uses a unique reference generated using the common data (e.g., wherein the unique reference is generated using a name of the schema; a unique integer) in order to identify the common data.

In the example herein, the persistor 219 uses a unique reference, namely, "123" to query the data store.

If upon querying, no results are obtained, the persistor 219 determines that common data have not already been persisted to the disk 224—responsively, the persistor 219 persists (block 335) the common data and a reference to the common data; the non-common data and the reference to the common data to the disk 224.

In one implementation, a data structure such as a database associated with the disk 224 is used to persist the common data and a reference to the common data; the non-common data and the reference to the common data. The data structure can be shared across a plurality of messages.

Figure 3:
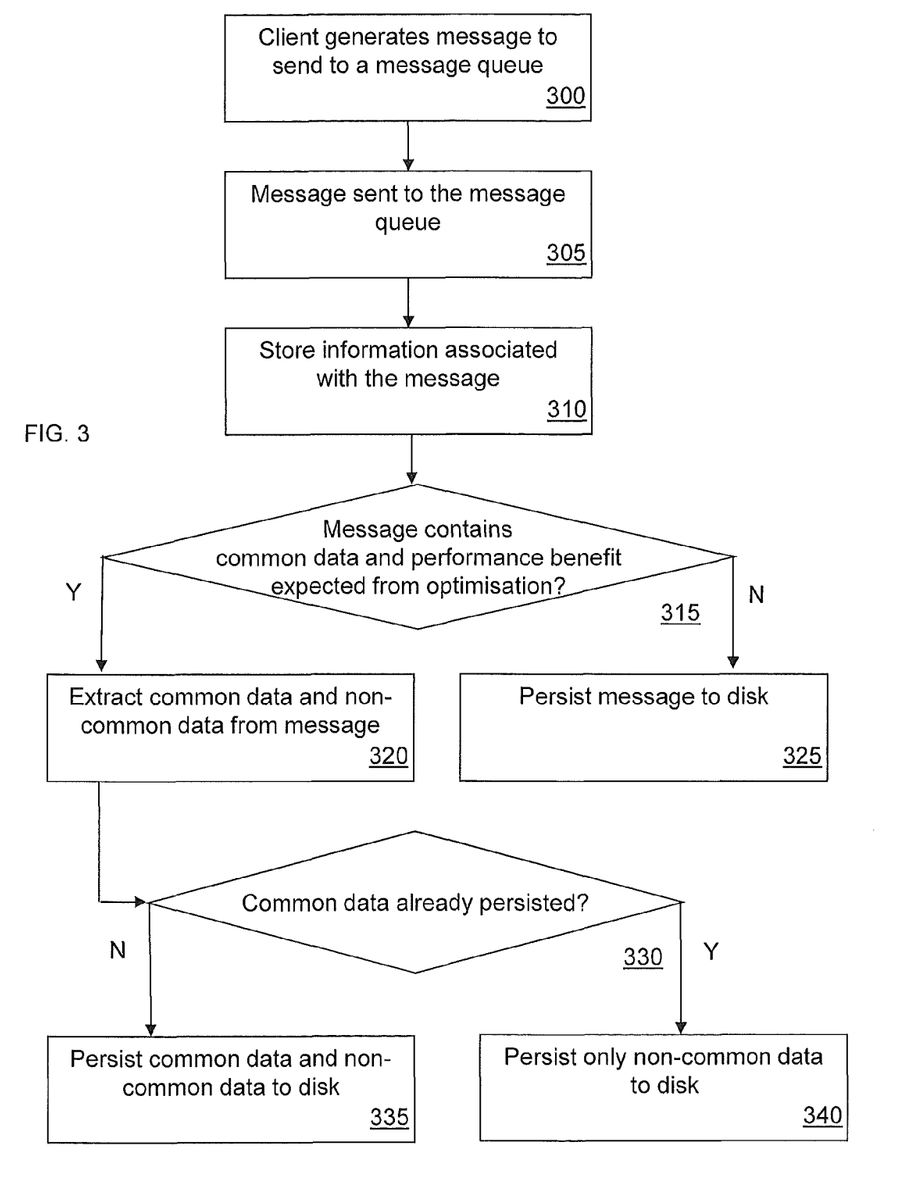
FIG. 3 is a flow chart showing the operational steps involved in a process according to an exemplary embodiment.

In the example herein, as a first iteration of the process of FIG. 3 is being carried out, the persistor 219 obtains no results from its query as no common data have been persisted yet. In response, the persistor 219 executes block 335. A representation of the outcome is shown below:

Common Data (226):
123: <message><a>var1</a><b>var2</b></message>
Non-Common Data (227):
123: var1=001; var2=Hello World In response to the client application 205 generating (block 300) a second message 207 depicted in FIG. 2A, the process of FIG. 3 is repeated.

At block 305, the client application 205 sends the generated second message 207 to the messaging system 215 which stores the second message 207 using the message queue 225.

The second message 207 is intercepted by the storer 216 of the evaluator component 220 and at block 310, the storer 216 stores information associated with the second message 207, for example:

"Message 002 originates from client application 205".

The storer 216 passes the second message 207 and associated message information to the comparator 217.

At block 315, the comparator 217 analyzes the second message 207 and the associated message information to determine whether the second message 207 contains common data.

In response to the analysis, the comparator 217 determines that the message information of the second message 207 comprises the same scope as the message information of the first message 206, namely, the same client application 205.

As stated above, the comparator 217 is pre-configured to make a determination at block 315 that each of the messages sent by the client application 205 share common data in the form of schema.

As such, at block 315, the comparator 217 determines that the second message 207 contains common data and associates the determination with the message information.

In the first example, the comparator 217 executes the following function:

total number of messages which share common data/
total number of messages*100

The result is shown below

2/2*100=100%

In the example herein, given that data are common across 100% of the messages and 100% is not less than 5%, in accordance with Rule 1, the comparator 217 determines that common data and non-common data should be separated and persisted separately.

In the example herein, at block 315, as the comparator 217 determines that a performance benefit is to be expected in accordance with Rule 1, the extractor 218 extracts (block 320) common data from the second message 207 by parsing the second message 207 in order to find schema data items. The extractor 218 also extracts (block 320) non-common data by parsing the second message 207 in order to find data that is not associated with schema data items.

The results of the parsing and extraction undertaken by the extractor 218 are shown below wherein the extractor 218 is pre-configured to represent any non-common data it finds located within the common data as variables (e.g., var1 and var2).

The common data are shown below:

```
<message>
    <a>var1</a>
    <b>var2</b>
</message>
```

The non-common data are shown below:
002
Hello World

Referring to FIG. 3, at block 330, the persistor 219 determines whether common data have already been persisted to the disk 224 by querying the data store with a unique reference associated with the common data, namely, "123".

In the example herein, results are obtained from the query and are represented below:
123: <message><a>var1</a><b>var2</b></message>

In response to the results, the persistor 219 determines that the common data have already been persisted to the disk 224—responsively, the persistor 219 persists (block 340) only the non-common data and the reference to the common data to the disk 224 as shown below:

Non-Common Data (228):
123: var1=002; var2=Hello World

Note that only a subset of the message data (namely, the non-common data) is persisted, yet an assured persistent quality of service is still maintained as the entire message data associated with a message is still available upon a failure (since the common data have already been persisted and a reference to the common data are associated with the non-common data).

Figure 6:
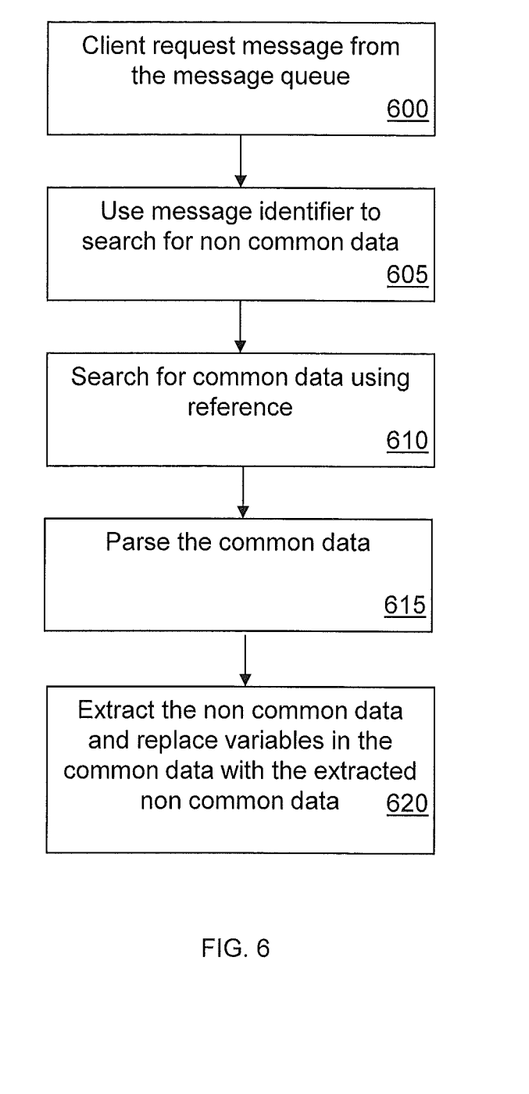
FIG. 6 is a flow chart showing the operational steps involved in another process according to an exemplary embodiment.

An embodiment associated with reconstruction of a message with respect to appending common and non-common data will now be described with reference to FIG. 6.

With reference to block 600, a client application requests consumption of a message having a message identifier (e.g., "001") from the queue 225.

The persistor 219 intercepts the request, parses the request in order to find the message identifier and searches (block 605) the disk 224 for the message identifier in order to find associated non-common data.

In an example herein, the persistor 219 finds the following non-common data:
123: var1=001; var2=Hello World The persistor 219 parses the non-common data in order to find an associated reference to the common data (the persistor 219 can be pre-configured to parse e.g., the first three characters of the non-common data in order to find the reference).

In the example herein, the persistor 219 finds the following reference:
123

At block 610, the persistor 219 uses the reference to search the disk 224 in order to find associated common data.

In the example herein, the persistor 219 finds the following common data:
123: <message><a>var1</a><b>var2</b></message>

At block 615, the persistor 219 parses the common data in order to find variables associated with any non-common data.

In the example herein, the persistor 219 finds the following variables:
var1
var2

At block 620, the persistor 219 extracts the non-common data found above and replaces the found variables with the non-common data.

In the example herein, the resulting message is shown below:

---
```
<message>
  <a>001</a>
  <b>Hello World</b>
</message>
```
---

The message can be passed to the consuming client application.

In another implementation, the queue 225 comprises a list of place holders such that when a consuming client application requests a message having a particular identifier, an associated place holder points the persistor 219 to common data and non-common data associated with the message such that the persistor 219 can reconstruct the message.

In yet another implementation, a message identifier can also be associated with common data such that the persistor 219 can find common data and non-common data using one query.

In yet another implementation, a cache is associated with the server computer system 210 and stores a message in its entirety such that reconstruction need not occur. In such an implementation, in response to a consuming client application requesting consumption of a message from the queue 225, a pointer associated with the queue 225 points the messaging server 215 to the entire message in the cache (e.g., using a message identifier associated with the request). Although this implementation requires extra overhead in terms of the cache, disk writes associated with persistence of the message in order to deliver assured persistent qualities of service are still saved.

Figure 4:
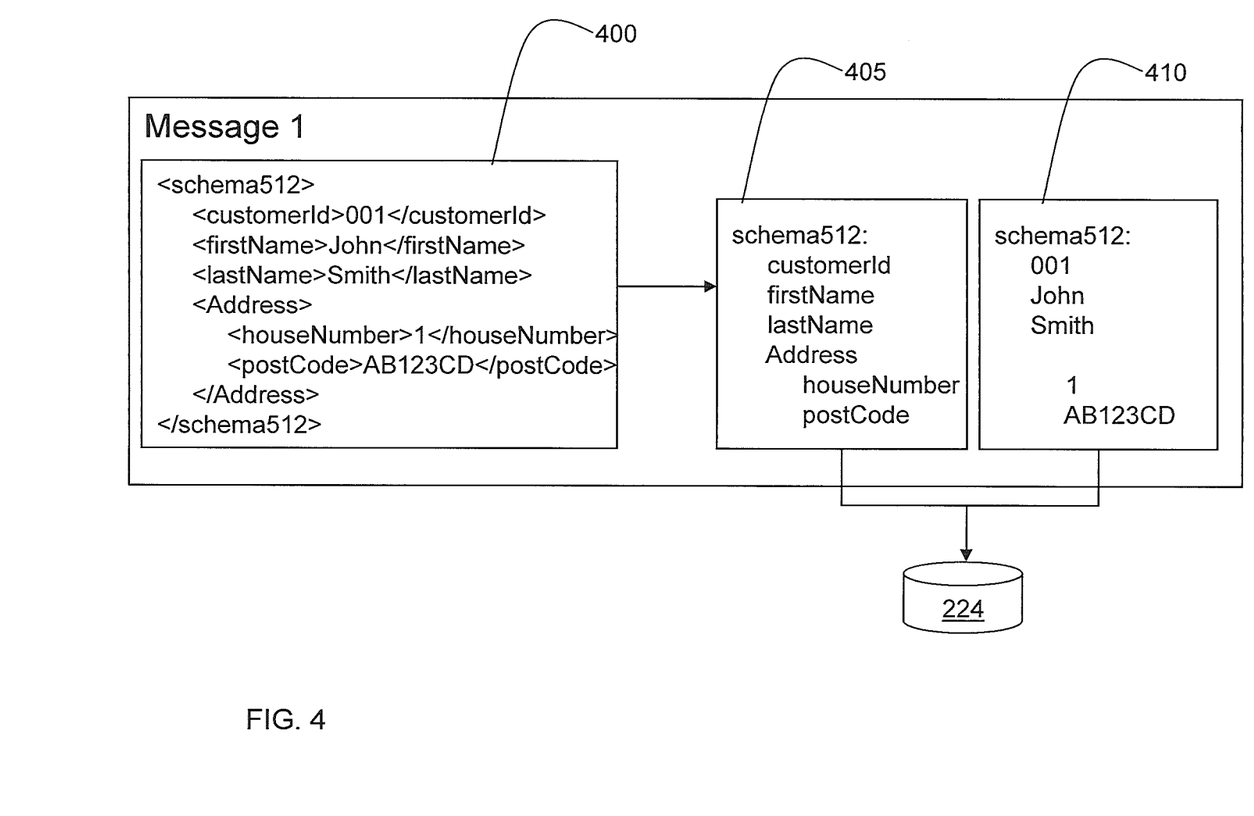
FIG. 4 is a block diagram of a first message having a schema.

In another example, with reference to FIG. 4, with reference to Message one 400, the extractor 218 extracts (block 320) common data associated with schema data items and extracts non-common data associated with non-schema data items.

The common data are shown below:
schema512
customerId
firstName
lastName
Address
houseNumber
postCode The non-common data are shown below:
001
John
Smith
1
AB123 CD The common data and the non-common data are associated with a reference to the common data, namely:
schema512

On a first iteration of the process of FIG. 3, as no common data have been persisted yet, the persistor 219 executes block 335 whereby the common data and a reference to the common data 405 and the non-common data and the reference to the common data 410 are persisted to the disk 224, as shown in FIG. 4.

Figure 5:
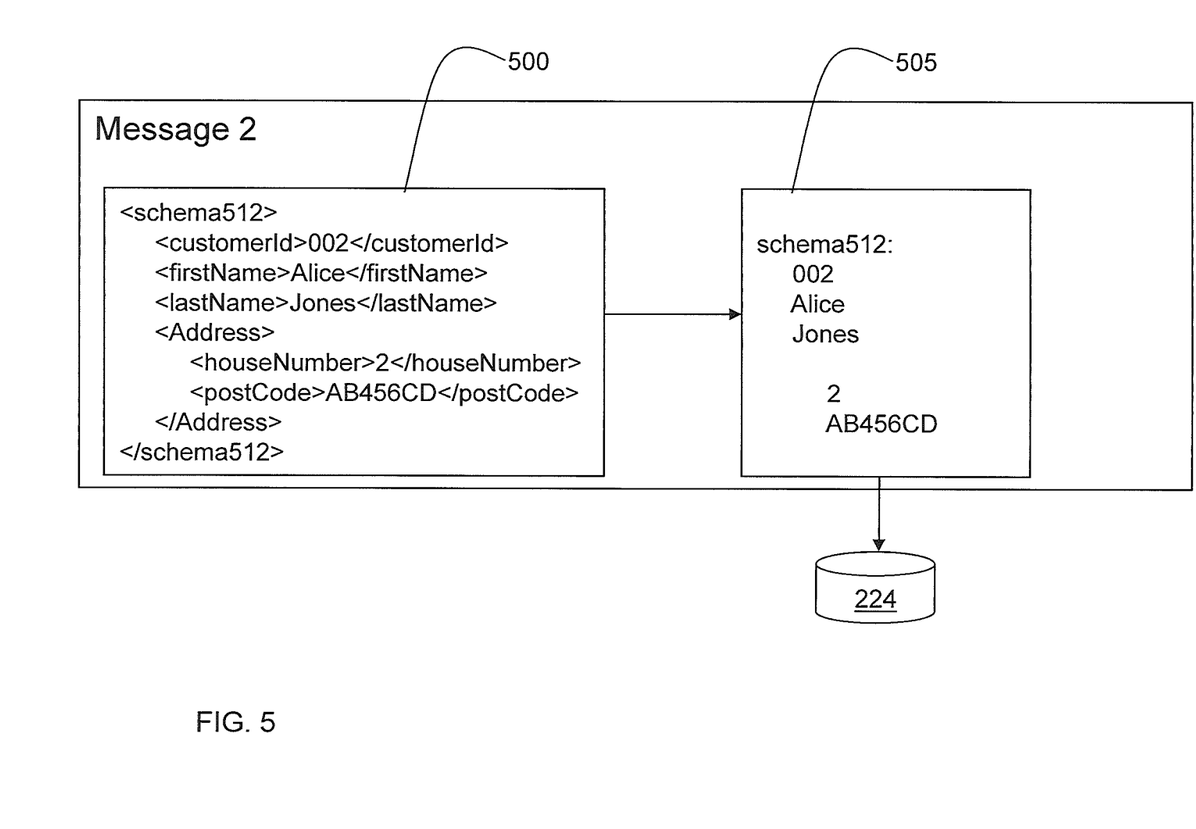
FIG. 5 is a block diagram of a second message having the same schema as shown in FIG. 4.

With reference to FIG. 5, with reference to Message two 500, as the common data have already been persisted to the disk 224, the persistor 219 persists (block 340) only the non-common data and the reference to the common data 500 (shown below) to the disk 224 as shown in FIG. 5:
Schema512:
002
Alice
Jones
2
AB456CD A number of alternative implementations; further examples and optimizations will now be discussed.

It should be understood that although the comparator 217 is pre-configured to make a determination that each of the messages sent by the client application 205 share common data in the form of schema only, in another implementation, in response to the comparator 217 parsing the second message 207; the comparator 217 uses the message information of the second message 207 to find messages having the same scope. In the example herein, the comparator 217 finds the first message 206 having the same scope, namely, wherein the scope comprises the same client application 205. In response to finding the first message 206, the comparator 217 compares the non-common data associated with the first message 206 and the second message 207 using a character match in order to determine whether the non-common data matches.

As detailed above, the non-common data for the first message 206 and the second message 207 are shown below:
Non-common data for the first message 206:
001
Hello World
Non-common data for the second message 207:
002
Hello World In response to the comparison, the comparator 217 determines that the following non-common data matches: "Hello World".

The matching non-common data can be assigned as common data.

In response to finding the match, the persistor 219 can persist (block 335) the common data to the disk 224 as represented below:
Common Data:
124: <message><a>var1</a><b>Hello World</b></message>

In yet another alternative implementation, the data structure associated with the disk 224 is used to persist the common data and a reference to the common data; the non-common data and a reference to the non-common data as shown below:

---
```
123: <message> <a>
456: </a> <b>var2</b></message>
```
---

The references to the common data and the non-common data can be associated with an identifier such as a message identifier as shown below:
{123}001{456}

A message can be reconstructed by retrieving the data associated with the reference to the common data; appending a string associated with the identifier (e.g., "001"); and retrieving and appending the data associated with the reference to the non-common data.

Further examples of the analysis executed by the comparator 217 in block 315 are discussed below.

In one example, the comparator 217 determines an amount of data that is common across a set of messages.

In an example, given the following data associated with a first message and a second message:
Message 1: Aaabbbcccdddeeefff
Message 2: Aaabbbcccccceeefff
the comparator 217 parses the data and finds two common data items, namely:
Aaabbbccc and eeefff The comparator 217 can be pre-configured to match data items of a minimum threshold size (e.g., six characters; a byte)—this is advantageous in that matching very small data items (e.g., two characters) is inefficient and may not provide for optimization with regards to separation and separate persistence of common data and non-common data.

For example, if, in response to analyzing each of the messages associated with the client application 205, the comparator 217 determines that 70% of each message is common (e.g., by determining the common data; and by applying a function to convert the size of the common data into a percentage of the total message size), in accordance with Rule 2 below, the comparator 217 determines that common data and non-common data should be separated and persisted separately:
Rule 2: If the common data are >60% of the message size, separate common data and non-common data Advantageously, in the example, performance gains can be obtained by separating common data and non-common data for persisting to disk if a relatively large percentage of a message has data in common with another message e.g., this is more likely in messages using structured information represented by e.g., XML.

Optionally, the comparator 217 can also determine an overhead associated with separating common data and non-common data. In one example, the overhead is predominantly associated with CPU cycles. The comparator 217 accesses CPU cycle data (e.g., by using provided libraries); monitors the cycle cost of a particular separation and stores information associated with overhead e.g., as a metric of time (e.g., 35 ms) or in terms of cycles (e.g., 478000 cycles), together with information associated with the message (e.g., the common data; a running count of the total number of messages). In a subsequent iteration, if the comparator 217 encounters another message having similar message information to the message information already stored, the comparator 217 retrieves the overhead information which is used in conjunction with one or more rules (an exemplary rule is shown below) to determine whether common data and non-common data should be separated and persisted separately:
Rule 3: If process time <20 ms and the data are common across >35% of messages, separate common data and non-common data Optionally, the comparator 217 uses system metrics to determine an overhead associated with separating common data and non-common data. The system metrics may be collected by the comparator 217 using an API and the metrics are associated with e.g., an Operating System (e.g., wherein the metrics comprise CPU utilization; disk utilization; disk queue length, etc.) and the messaging system 215 (e.g., wherein the metrics comprise queue depths; average application response times, etc.). An example of the API commands used is shown below for the Windows (Microsoft, Windows, Windows NT, and the Windows logo are trademarks of Microsoft Corporation in the United States, other countries, or both) operating system whereby (a) represents opening a query object which is used to manage the collection of performance data; (b) represents adding a counter for total processor time; and (c) represents collecting the data:
(a) PdhOpenQuery(NULL, NULL, &query);
(b) PdhAddCounter(query, TEXT("\\Processor(_Total)\\% Processor Time"), 0, &counter);
(c) PdhCollectQueryData(query);

If, for example, the comparator 217 determines that a 5 KB data structure is common across 7% of messages, the comparator 217 determines an overhead associated with separating common data and non-common data by monitoring one or more system metrics associated with these actions. The comparator 217 stores information associated with overhead (e.g., wherein the overhead information details that during separation of data and generation of a reference, CPU utilisation increases by 5%) together with information associated with the message (e.g., the common data; a running count of the total number of messages). In a subsequent iteration, if the comparator 217 encounters another message having similar message information to the message information already stored, the comparator 217 retrieves the overhead information which is used in conjunction with one or more rules (an exemplary rule is shown below) to determine whether common data and non-common data should be separated and persisted separately:
Rule 4: If CPU utilisation >80% and the data are common across <15% of messages, do not separate common data and non-common data Optionally, a user can make a decision that in MOM solutions that process messages having a relatively large amount of common data e.g., messages written in mark up language formats such as XML, a determination of an overhead associated with separating common data and non-common data need not be carried out.

In an optimization for multi-threaded environments, a separate thread can be created for executing the process of an embodiment—such a thread can also be offloaded to a separate server from the server hosting the messaging system in order to reduce the impact on work that the messaging system is processing.

In a further optimization, common data and non-common data can be separately stored on physical disks—such an optimization allows read and write operations to occur simultaneously on the common data and non-common data and additionally lessens the load compared with using a single disk, which may become a bottleneck. This is particularly useful in a number of scenarios.

For example, it should be understood that messages utilizing the Extensible Markup Language (XML) format that are being processed in a MOM solution, typically contain a high degree of common data (primarily located in message headers and XML tags). It is not uncommon for the majority of a messages to share >90% common data.

In an example, if the size of a typical message is 1 KB and the message contained 0.9 KB of common data; if 10,000 persistent messages were being processed per second, an embodiment can save around 9 MB/s disk write activity which is a 90% reduction in persistent I/O—see formula below:
m/s=messages per second $$(1\ KB * 10\ 000\ m/s) - (0.9\ KB + (0.1\ KB * 10\ 000\ m/s)) = 8999.1\ KB/s$$

Further, an embodiment can benefit MOM solutions implementing database look-up functionality—in such a solution although a look-up request may typically be small in size, there is often a large proportion of common data with the non-common data being e.g., only a single field identifying a particular record. For example, in the message below, the non-common data only comprises five characters, namely, "1"; "A"; and "1_A":

```
<message>
  <key>1</key>
  <database>A</database>
  <server>1_A</server>
</message>
```

Thus, once the common data have been persisted, by persisting only the non-common data on subsequent iterations, performance savings can be made.

Further, the embodiment can benefit MOM solutions implementing client/server negotiation e.g., wherein a schema for a protocol to be used is negotiated. In such cases, once negotiated, the negotiated schema is typically used in one or more subsequent communications. Using an embodiment, the negotiated schema can be persisted on a first iteration of the process and subsequently, only the non-common data that is sent over the wire need be persisted.

Further, an embodiment can benefit MOM solutions which use multiple message queues that each require persistence. In an example, if Message A is:
  put on Queue 1 by a first application;
  persisted in its entirety from Queue 1;
  got from Queue 1 by a second application, whereby the second application executes a process on Message A;
  put on Queue 2 by the second application; and
  persisted in its entirety from Queue 2,
if the common data associated with Message A is unchanged following the example actions above, according to contemporary solutions, the common data are persisted twice (once from Queue 1 and once from Queue 2). According to an embodiment, the common data would be persisted once from Queue 1 and only a reference to the common data need be persisted from Queue 2.

In summary, according to a first aspect, there is provided an apparatus for controlling persisting of data to disk for use with a messaging system comprising an application operable for generating and sending a message to a destination, the apparatus comprising: a comparator for determining whether the message comprises common data; an extractor, responsive to a determination that the message comprises common data, for extracting the common data and non-common data from the message; and a persistor for determining whether the common data have already been persisted to disk, wherein the persistor is operable, in response to a determination that the common data have not already been persisted to disk, to separately persist the common data and the non-common data to disk and wherein the persistor is operable, in response to a determination that the common data have already been persisted to disk, to persist the non-common data to disk.

According to a second aspect, there is provided a method for controlling persisting of data to disk for use with a messaging system comprising an application operable for generating and sending a message to a destination, the method comprising: determining whether the message comprises common data; extracting, in response to a determination that the message comprises common data, the common data and non-common data from the message; determining whether the common data have already been persisted to disk, separately persisting, in response to a determination that the common data have not already been persisted to disk, the common data and the non-common data to disk; and persisting, in response to a determination that the common data have already been persisted to disk, the non-common data to disk.

According to a third aspect, there is provided a computer program comprising program code means adapted to perform the method above when the program is run on a computer.

An embodiment can take advantage of existing optimizations such as caching and asynchronous I/O.

Further, an embodiment provides a number of technical effects.

Firstly, by only persisting non-common data subsequently to persisting common data, an embodiment reduces the amount of data that is needed to be written to disk which generates an increase in run time performance associated with a computer system and also affects a process (e.g., write operations to disk) executed outside a computer.

Further, using an embodiment rather than e.g., contemporary art compression does not result in a message being persisted that is larger than its original size—rather, on a first iteration, common data and non-common data are persisted and on subsequent iterations, only non-common data are persisted—this results in savings in terms of costs and overhead associated with storage thereby affecting a process executed outside a computer.

Further, contemporary art compression is likely to be performed as a blanket operation in that it is typically applied to each message—an embodiment on the other hand by e.g., determining an overhead associated with extracting the common data and non-common data from the message in accordance with one or more rules, assesses the performance benefits to be gained prior to performing extraction of common data and non-common data. This allows for run time performance associated with a computer system to be optimized.

Further, by associating messages with a scope, aids in grouping messages with common data (e.g., as messages from the same queue or from the same client application are more likely to have common data) thereby saving overhead and performance associated with determining whether a message has common data.

What is claimed is:

1. An apparatus for controlling persisting of data to disk for use with a messaging system comprising an application operable for generating and sending a message to a destination, the apparatus comprising:
   a processor in communication with one or more types of memory, the processor configured to:
   facilitate a comparator operable to
     determine that the message comprises common data,
     determine that a performance benefit is gained by separating and persisting separately the common data and non-common data of the message, wherein a determination that the performance benefit is gained is made by determining a percentage of messages from the application comprising common data exceeds a predetermined threshold;
   facilitate an extractor, responsive to a determination that the message comprises common data, configured to extract the common data and non-common data from the message and represent the non-common data located within the common data as variables comprising placeholders within the common data for each associated data item of the non-common data; and facilitate a persistor operable to determine whether the common data have already been persisted to disk, wherein the persistor is operable, in response to a determination that the common data have not already been persisted to disk, to separately persist the common data and the non-common data represented by the variables to disk and wherein the persistor is operable, in response to a determination that the common data have already been persisted to disk, to persist the non-common data represented by the variables to disk, wherein the common data is persisted with a unique reference and the non-common data is persisted with the unique reference on a per message basis.

2. The apparatus of claim 1 wherein the comparator is pre-configurable to determine that a structure associated with the message comprises common data.

3. The apparatus of claim 1 wherein the comparator is operable to determine an overhead associated with extracting the common data and non-common data from the message in accordance with one or more rules.

4. The apparatus of claim 1 wherein the persistor is operable to use the unique reference associated with the common data to query a data store in order to determine whether the common data have already been persisted.

5. The apparatus of claim 1 wherein the persistor, responsive to a determination that the message does not comprise common data, is operable to persist the message to disk.

6. The apparatus of claim 1 wherein the comparator is operable to parse a set of messages generated by the application and match data associated with the messages in order to determine whether the message comprises common data.

7. The apparatus of claim 1 wherein the message is associated with a scope.

8. The apparatus of claim 1 wherein in response to another application requesting the message from the destination, the persistor is operable to reconstruct the message by appending the separately persisted common data and non-common data.

9. A method for controlling persisting of data to disk for use with a messaging system comprising an application operable for generating and sending a message to a destination, the method comprising:

determining that the message comprises common data;

determining that a performance benefit is gained by separating and persisting separately the common data and non-common data of the message, wherein a determination that the performance benefit is gained is made by determining a percentage of messages from the application comprising common data exceeds a predetermined threshold;

extracting, in response to a determination that the message comprises common data, the common data and non-common data from the message;

representing the non-common data located within the common data as variables comprising placeholders within the common data for each associated data item of the non-common data;

determining whether the common data have already been persisted to disk;

separately persisting, in response to a determination that the common data have not already been persisted to disk, the common data and the non-common data represented by the variables to disk; and persisting, in response to a determination that the common data have already been persisted to disk, the non-common data represented by the variables to disk, wherein the common data is persisted with a unique reference and the non-common data is persisted with the unique reference on a per message basis.

10. The method of claim 9 further comprising: determining that a structure associated with the message comprises common data.

11. The method of claim 9 further comprising: determining an overhead associated with extracting the common data and non-common data from the message in accordance with one or more rules.

12. The method of claim 9 further comprising: using the unique reference associated with the common data to query a data store in order to determine whether the common data have already been persisted.

13. The method of claim 9 further comprising: persisting, in response to a determination that the message does not comprise common data, the message to disk.

14. The method of claim 9 further comprising: parsing a set of messages generated by the application and matching data associated with the messages in order to determine whether the message comprises common data.

15. The method of claim 9 wherein the message is associated with a scope.

16. The method of claim 9 further comprising: reconstructing, in response to another application requesting the message from the destination, the message by appending the separately persisted common data and non-common data.

17. A computer program product for controlling persisting of data to disk for use with a messaging system comprising an application operable for generating and sending a message to a destination, the computer program product comprising:

a non-transitory storage medium readable by a processing circuit and storing instructions for execution by the processing circuit for performing a method comprising:

determining that the message comprises common data;

determining that a performance benefit is gained by separating and persisting separately the common data and non-common data of the message, wherein a determination that the performance benefit is gained is made by determining a percentage of messages from the application comprising common data exceeds a predetermined threshold;

extracting, in response to a determination that the message comprises common data, the common data and non-common data from the message;

representing the non-common data located within the common data as variables comprising placeholders within the common data for each associated data item of the non-common data;

determining whether the common data have already been persisted to disk;

separately persisting, in response to a determination that the common data have not already been persisted to disk, the common data and the non-common data represented by the variables to disk; and persisting, in response to a determination that the common data have already been persisted to disk, the non-common data represented by the variables to disk, wherein the common data is persisted with a unique reference and the non-common data is persisted with the unique reference on a per message basis.

18. The computer program product of claim 17 further comprising: determining that a structure associated with the message comprises common data.

19. The computer program product of claim 17 further comprising: determining an overhead associated with extracting the common data and non-common data from the message in accordance with one or more rules.

20. The computer program product of claim 17 further comprising: using the unique reference associated with the common data to query a data store in order to determine whether the common data have already been persisted.

* * * * *